April 30, 1946.   W. A. PATRICK, JR., ET AL   2,399,246
DEHYDRATING METHOD AND APPARATUS
Filed June 27, 1942   4 Sheets-Sheet 2
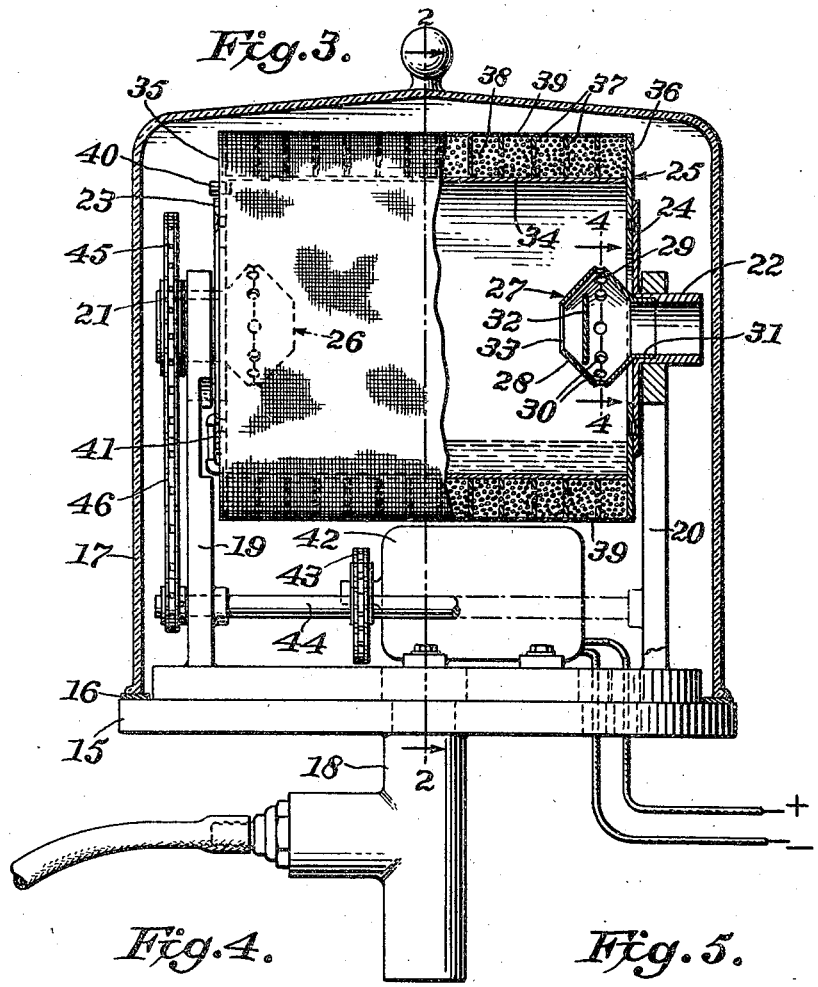
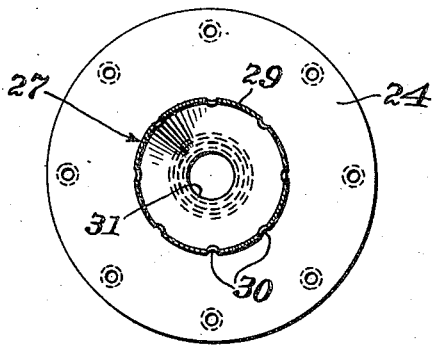
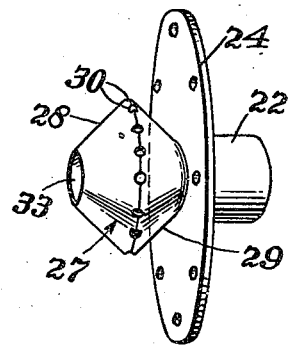
Inventor:
Walter A. Patrick, Jr.
John D. Elder,
By Cushman Darby & Cushman
Attorneys

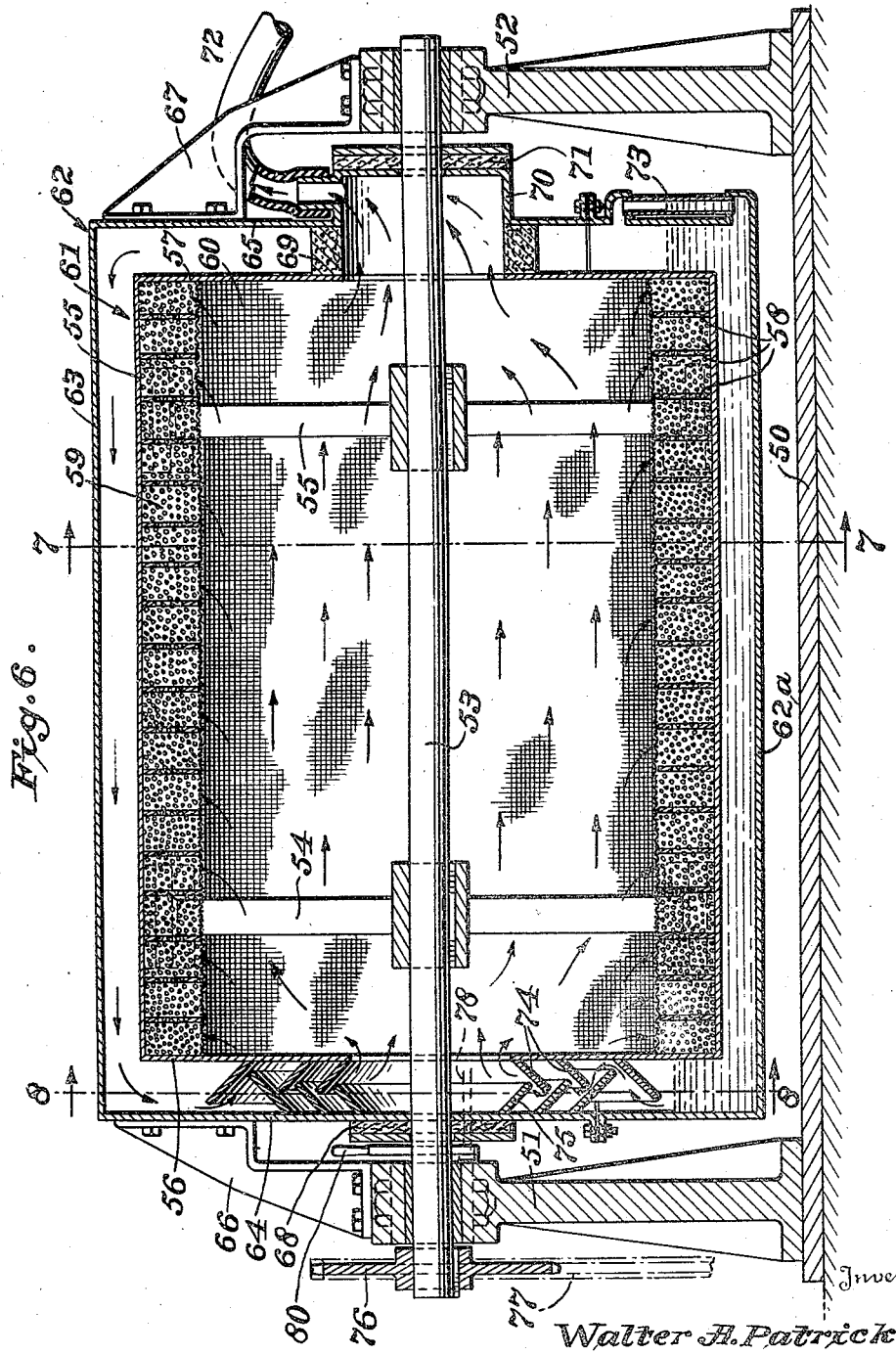

Patented Apr. 30, 1946

2,399,246

UNITED STATES PATENT OFFICE 2,399,246

DEHYDRATING METHOD AND APPARATUS

Walter A. Patrick, Jr., and John D. Elder, Baltimore, Md.; said Elder assignor to Crown Cork & Seal Company, Inc., Baltimore, Md., a corporation of New York Application June 27, 1942, Serial No. 448,875

13 Claims. (Cl. 159—49)

This invention relates to method and apparatus for dehydrating, or concentrating, any material required to be so treated, for example, biological products such as serums, vaccines, etc., and foods such as eggs, fruit juices, etc. The principal object of the invention is to provide a system whereby the materials may be efficiently and relatively rapidly and inexpensively reduced to the desired state.

According to prior processes, it has been customary to subject a quiescent mass of material to reduced pressure, and usually the material has to be sublimed from frozen state. Both of these features contribute to slow and expensive procedures, not practicable for ordinary commercial operations.

According to the present invention, we form a film of the material to be treated and subject this film to redt .d pressure to promote evaporation, while preferably maintaining in the evaporation zone an above freezing temperature. While such a film may be formed in various ways, we prefer to form it continuously on an endless surface whereon the film is continuously renewed. As will be described in detail hereinafter, this may be simply done by placing a batch of the material in the lower portion of a rotary drum, or by immersing the lower external portion of a rotary drum in a batch of the material.

In the use of desiccants in the nature of sorptive agents such as silica gel, Activated Alumina, etc., the temperature of the desiccant is raised as a result of the condensation thereby of the water vapor derived from the drying substance. The term "sorb" is used herein as covering the phenomena of adsorption and absorption, that is to say, the idea of mechanical condensation in general. Where the desiccant is in the nature of a chemical with which the water vapor will react to form a hydrate, there is a resultant heat of reaction. The term "desiccant" as used herein denotes any substance which will take up evolved vapor either by sorption or chemically with a consequent generation of heat, and the present invention preferably involves the use of such a desiccant disposed in heat transferring relation to the film-carrying surface so that the heat, or a portion of it, of the desiccant is transferred to the evaporating zone with the result that the desiccant is automatically maintained at an efficient temperature while the evaporating zone is automatically maintained at an above freezing temperature.

The manner of carrying out the invention will be clearly understood from the following description of illustrative apparatus as shown in the accompanying drawings, in which:

Figure 3 is a view taken at right angles to that of Figure 1, with further parts in section;

Figure 4 is a section on line 4—4 of Figure 3;

Figure 5 shows in perspective an end plate, trunnion, and baffle unit which appears in Figure 3;

Figure 6 shows in axial section another embodiment of the invention;

Figure 1:
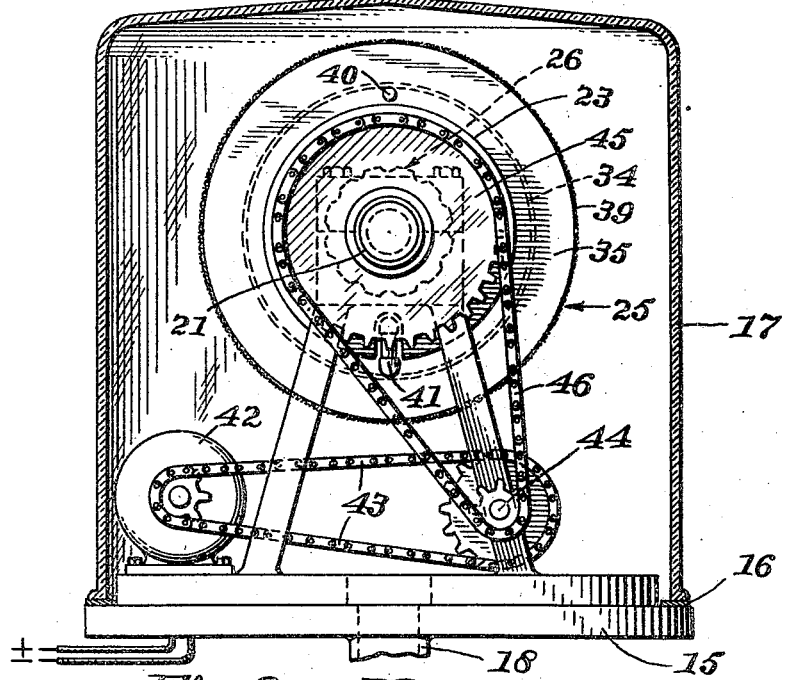
Figure 1 is a view, partly in section and partly in elevation, of one form of suitable apparatus.
Figure 2:
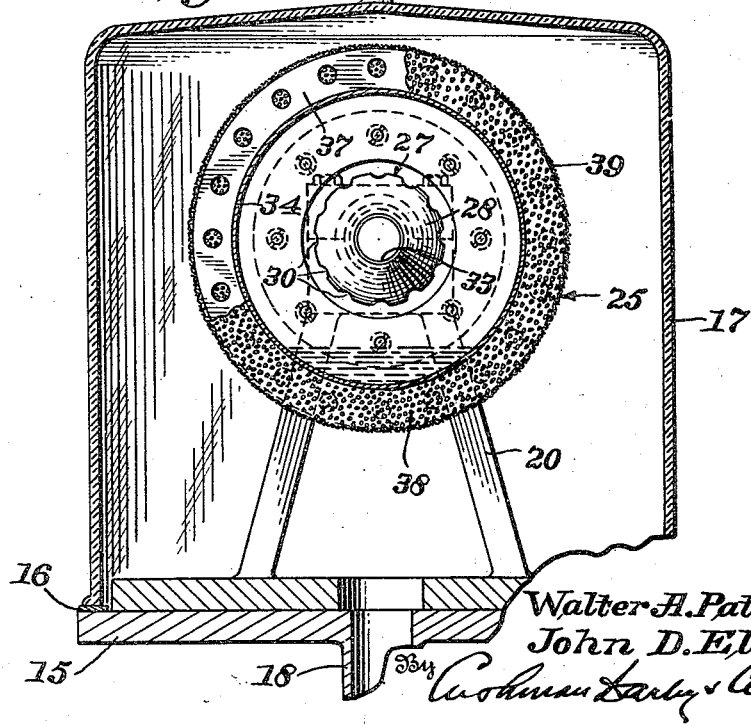
Figure 2 is a section substantially on line 2—2 of Figure 3.

Referring to the drawings, and first to Figures 1 to 5, reference numeral 15 designates a base plate having a top annular shoulder to which is fixed a sealing gasket 16 on which is adapted to rest the lower edge of a glass bell 17, as here shown. The base plate and the bell constitute a vacuum chamber with a suction connection 18 leading from the bottom center of the base plate. Uprights 19 and 20 mounted on the base plate have at their upper ends horizontal bearing portions in which are journaled hollow or tubular trunnions 21 and 22 which are fixed centrally of circular end plates 23 and 24, the end plates constituting portions of a drum generally indicated by the reference numeral 25. Baffle devices 26 and 27 project inwardly from the trunnions 21 and 22, respectively, and the structure of the device 27 is shown in detail in Figures 3, 4, and 5. It comprises an open-ended hollow body formed of similar frusta 28 and 29 with their large ends joined together, radial openings 30 being formed on the line of juncture. Portion 29 includes a sleeve 31 tightly received in an annular internal enlargement of trunnion 22. A circular plate or disc 32 is positioned within the internal enlargement defined by the frusta inwardly of the open end 33, and is of greater diameter or area than the opening 33 so as to block any direct passage from the said opening to the trunnion. However, the area of the annular space between the disc and the walls of portion 28 is at least as great as the area of opening 33 so that while flow through the latter will be deflected, the flow capacity is not affected.

Drum 25 includes a cylindrical shell 34 whose ends are fixed to and secured against intermediate portions of annular plates 35 and 36, end plate 23 overlapping and being secured to the inner margins of plate 35, and end plate 24 being similarly secured to plate 36 so that shell 34 is supported coaxially with the trunnions. Embracing shell 34 are a number of uniformly spaced perforated annular fins 37, and between these fins the desiccant 38, preferably silica gel, is packed against shell 34. The latter and fins 37 are of metal having good heat conductivity, for example, copper, and the fins are secured to the shell, as by soldering, in order to establish good thermal contact. The desiccant is held in place by a cylinder 39 of wire mesh whose ends are fixed to the peripheries of plates 35 and 36.

Reference numeral 40 designates a plug for a filling and emptying opening formed in plate 35 just inwardly of the inner surface of shell 34, and reference numeral 41 designates a liquid level indicator operatively associated with plate 35 for the purpose of indicating the level of liquid in the bottom portion of the drum.

Reference numeral 42 designates an electric motor with supply leads passing through and sealed in openings in base plate 15. A sprocket on the motor shaft drives, through chain 43, a sprocket fixed on a counter shaft 44 journaled in frames 19 and 20, and a further sprocket on shaft 44 drives a sprocket 45, fixed on trunnion 21, through chain 46, whereby to rotate the drum 45.

With the drum in the position shown in Figures 1 and 3, and bell 17 removed, the material to be treated is introduced into the drum through the filling opening to the proper level as shown by the indicator 41. Plug 40 being replaced, the motor and the vacuum producing means are started. The vacuum producing means can be an ordinary vacuum pump, but since high vacuum is not required in the operation of the apparatus, a small capacity steam jet evacuator is preferably used.

As the drum is rotated, the inner surface of shell 34 carries on it a film from the batch in the bottom of the drum, which film, as the drum rotates, is continuously returned to the batch and renewed, being subjected to the low pressure communicated to the interior of the drum through the hollow trunnions. Due to the large area of exposed film, evaporation is greatly accelerated. The evolved vapors pass around the exterior of the drum and into the desiccant disposed in that part of the suction or vacuum line defined between the bell 17 and shell 34, so as to be more or less completely taken up, with a consequent generation of heat. This heat, or part of it, is transferred by the desiccant and the fins 37 to the shell 34. The capacity of the desiccant in relation to the evaporating capacity of the drum is such that an above freezing temperature is maintained in the drum; and the heat abstraction from the desiccant is such as to maintain the latter at an efficient, substantially constant, operating temperature. The capacity of the desiccant for the purpose of maintaining the material being dehydrated at an above-freezing temperature is determined by several factors; for example, when silica gel is used the factors include the area of gel surface exposed to the heat conducting surfaces, including the fins 37 and 58, Figs. 3 and 6, respectively, the thickness of the gel layers, and the temperature gradient between the gel and the material being dehydrated.

The constant wetting of the interior surfaces not only has the advantage of preventing drying of the material on the wall, which would cause eventual insulation to an undesirable extent, but this wetting also increases the exposed area of the material and takes advantage of the principle that evaporation is directly proportionate to the exposed area. The speed of rotation of the drum is not critical and it is only necessary that it be sufficient to keep the interior walls at all times wet.

The purpose of the baffles is to prevent liquid which tends to splash up from being discharged. The splash strikes the baffle plates as at 32 and drains back to the drum interior through the holes, as at 30. The construction is such that there is no increase in the velocity of the vapors as they pass through the baffle chamber. Increase in velocity would tend to cause the vapors to entrain liquid and consequently, as above pointed out, the area around the baffle plates is at least equal to the area of the openings as at 32.

The fins are perforated in order to permit an equalization of the vapor pressure throughout the entire body of the desiccant. Maximum efficiency can be obtained only when the desiccant is of substantially uniform effectiveness throughout. The fins serve to improve the heat transmission by collecting the heat quickly and transferring it directly to the shell 34. In their absence, heat from the outer zones of the desiccant would have to pass through the inner zones in order to reach the drum wall, and silica gel, for example, is of low thermal conductivity.

Inasmuch as the drum of the described apparatus can be readily filled and emptied only through the opening normally closed by the plug 40, the dehydrating or concentrating operation will not be carried beyond a point at which the material is still fluid enough to be drained through the opening, which opening can, of course, be made of larger size than that indicated, if desired. With a larger opening, the material can be pre-frozen and introduced into the drum in lumps in this condition. Entrained gases are quickly removed by suction when the material is in frozen condition, and consequently the dehydrating operation may be preceded by a degassing operation with the material in initially frozen condition. Of course, the thawing process would begin almost immediately where a desiccant like silica gel is used, since heat would immediately start to develop as a result of the adsorption of the gases. The pre-frozen material quickly becomes liquid so as to be spread as a film on surfaces of the drum.

A particular application of the described apparatus is in the dehydration of animal blood serum in the manufacture of adhesive for uniting the cushion discs of crown caps to the metal shells. For this purpose, a serum having 46.64% solids is desired, whereas blood serum usually has about 8.8% solids. In this case 750 units, for example, of blood serum may be introduced into the chamber and dehydration continued until the volume is reduced to 140 units. This residue, while viscous as compared to the original serum, may be drawn off through the drum opening, the apparatus being canted for this purpose if necessary. The product may then be dialysed to decrease the salt content to the average initial salt content of approximately 1%.

Figure 7:
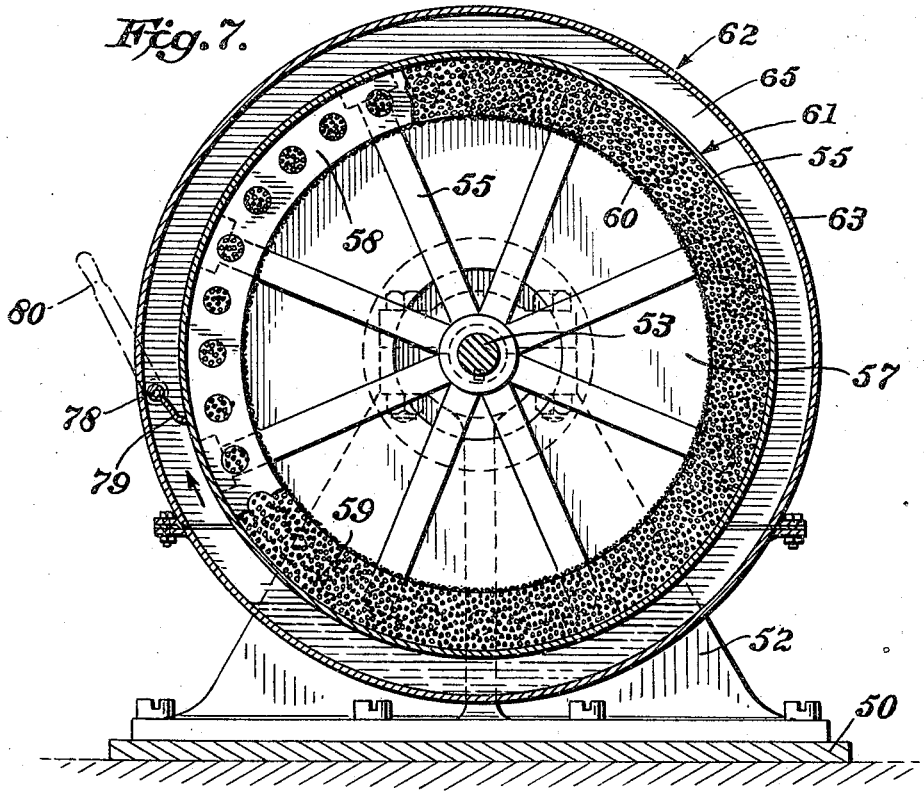
Figure 7 is a section on line 7—7 of Figure 6.
Figure 8:
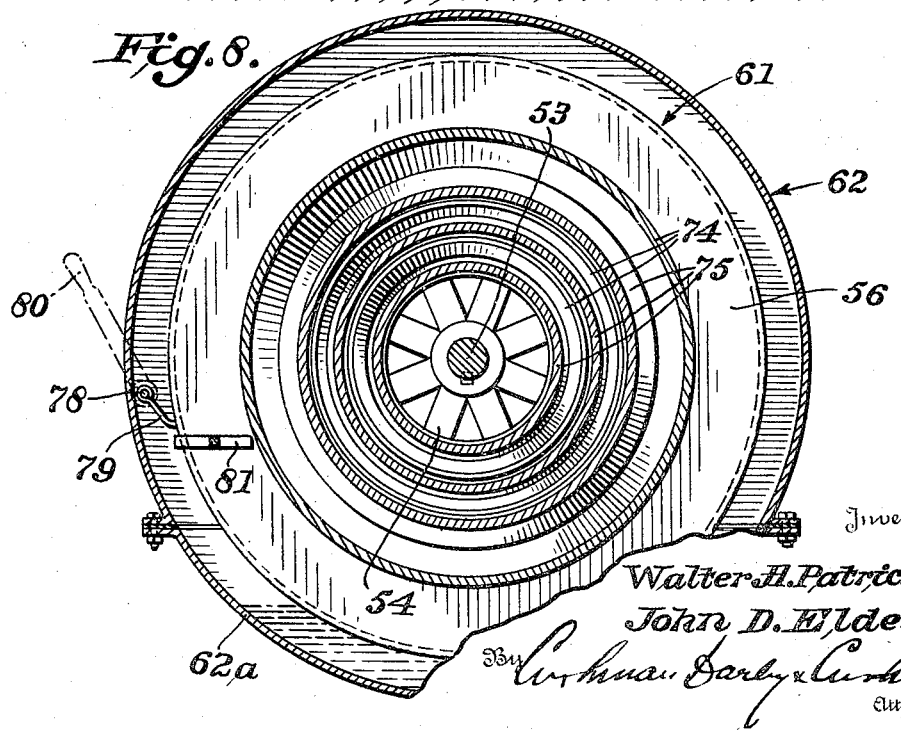
Figure 8 is a section on line 8—8 of Figure 6.

If further dehydration is desired, apparatus such as is shown in Figures 6 to 8 may be used, although it will be understood that the apparatus shown in these figures is equally well utilizable in dehydrating material from original condition.

Referring to these figures, reference numeral 50 designates a base to which are fixed uprights 51 and 52 having at their upper ends bearings in which is journaled a horizontal shaft 53. Spiders 54 and 55 are fixed on shaft 53 and the outer extremities of their arms are secured to a cylindrical metal shell 55, to whose ends are secured and sealed annular end plates 56 and 57. Perforated annular fins 58 are secured within the shell 55 in good thermal contact therewith and a mass 59 of desiccant is packed between the fins and against the inner surface of the shell, being retained by a wire mesh cylinder 60.

The drum thus constituted, and indicated as a whole by the reference numeral 61, is disposed within an outer chamber in the form of a cylindrical drum 62 which includes a cylindrical shell 63 and end walls 64 and 65. Brackets 66 and 67, rising from the pedestals 51 and 52, are secured to the end walls 64 and 65 for the support of drum 62. These end walls are perforated for the passage of shaft 53 and wall 64 carries packing means 68 so that a fluid-tight joint is formed between the wall and the shaft. Wall 65 has a central opening registering with the opening of end plate 57 of drum 61, and fixed to one or the other of these elements is an annular gasket 69 which forms an air-tight joint between them. Wall 65 has a horizontally projecting neck 70 which carries at its outer end packing means 71 forming a fluid-tight joint with shaft 53, the neck 70 being provided with a nipple to which is connected a hose 72 leading to any suitable vacuum producing means. At its lower part the drum is split in a horizontal plane, and the two parts are flanged and adapted to be secured together, through the intermediary of a sealing gasket, by any readily releasable means. The lower portion 62a of the drum is equipped with a liquid level indicating device 73. The end plate 56 of drum 61 has fixed thereto around its opening a series of concentric outwardly flared baffle plates 74, and these are interleaved with similar baffle plates 75 fixed on end wall 64, the interleaved baffles being out of contact with each other to provide a tortuous passage from the outside of drum 61 to its interior.

Shaft 53 has fixed thereon a sprocket 76 adapted to be driven from any suitable source of power through a chain 77.

In the operation of this apparatus, drum portion 62a, which constitutes a pan, is dropped, or removed, and filled to a suitable level with the material to be treated, being then replaced in position. The drum is now rotated in the direction of the arrow, Figure 7, and the vacuum producing means set in operation. The lower portion of drum 61 being immersed in the material, as shown in Figures 6 and 7, carries therefrom a film of the material as the drum is rotated, this film being returned to the batch and continuously renewed. The film is subjected to the vacuum induced through tube 72 and the drum interior, and the desiccant being, as before, interposed in the suction line, the vapor passing through the drum is more or less taken up, and the same heat transfer, as before, occurs.

Inasmuch as the machine of Figure 6 to 8 is intended to be able to carry out the dehydrating process to such an extent as to give a substantially solid product, toward the end of the operation it is necessary to provide means for scraping the solidifying film from the surfaces of drum 61. For this purpose, we pivot a shaft 78 in the end walls 64 and 65 in the annular space between the two drums, as particularly shown in Figures 7 and 8, this shaft having fixed thereto a scraper or doctor 79, which may be adjusted by means of an external handle 80 between operative and inoperative positions. In Figures 7 and 8, the weight of handle 80 holds the scraper against the drum periphery. When the handle is swung to the right beyond the vertical, its weight will hold the scraper away from the drum. Inasmuch as the outer marginal portions of plates 66 and 67 will also collect films, scrapers for these portions as at 81, Figure 8, are provided, these being mounted on square shafts slidable in packings carried by the end walls 64 and 65, the scrapers being preferably spring pressed into engagement with the drum ends but retainable in retracted relation by any suitable means.

The baffle elements 74 and 75 prevent splash from reaching the desiccant and from being carried out with the vapor.

When the dehydrating step has been completed, the pan 62a is again detached and its contents removed.

The same general remarks as to features of operation apply to the second embodiment as to the first.

It will be understood that the disclosed apparatus has been given only by way of example, and that the invention extends to all procedures and apparatus coming within the terms of the following claims.

We claim:

1. The method of dehydrating which comprises continuously passing a portion of an endless traveling member into a batch of the material to be dehydrated whereby a film of the material is withdrawn from the batch on said member and is returned to the batch, subjecting the film to reduced pressure to promote evaporation, and passing the evolved vapors into a desiccant which is in heat exchanging relation with said film.

2. The method of dehydrating which comprises immersing in a batch of the material to be dehydrated a lower portion of an endless member traveling in an orbit about a horizontal axis, whereby to cause the unimmersed portion of said member to carry a film of the material, subjecting the film to reduced pressure to promote evaporation, and passing the evolved vapors into a desiccant which is in heat exchanging relation with said film.

3. Dehydrating apparatus comprising a chamber, a drum rotatable in said chamber on a horizontal axis and having end walls so that a batch of the material to be dehydrated can be contained in the bottom portion of the drum and a film of the material will be carried on the inner surfaces of the drum above the batch when the drum is rotated, a layer of desiccant surrounding the drum and exposed to the atmosphere in the chamber, and a suction connection to said chamber.

4. Dehydrating apparatus comprising a chamber, a drum rotatable in said chamber on a horizontal axis and having end walls so that a batch of the material to be dehydrated can be contained in the bottom portion of the drum and a film of the material will be carried on the inner surfaces of the drum above the batch when the drum is rotated, a layer of desiccant surrounding the drum and exposed to the atmosphere in the chamber, means securing said layer on the drum to rotate therewith, and a suction connection to said chamber.

5. Dehydrating apparatus comprising a chamber, a drum in said chamber, said drum having end walls and trunnions secured thereto, at least one of said trunnions being hollow and serving to place the drum interior in communication with the chamber, means supporting the trunnions on a horizontal axis, means for rotating the drum, said drum being adapted to contain in its bottom portion a batch of the material to be dehydrated whereby upon rotation of the drum a film of the material will be carried on its inner surfaces above the batch, a suction connection to said chamber, and a body of desiccant in said chamber for the sorption of the vapor evolved from said material.

6. Dehydrating apparatus comprising a chamber, a drum in said chamber, said drum having end walls and trunnions secured thereto, at least one of said trunnions being hollow and serving to place the drum interior in communication with the chamber, means supporting the trunnions on a horizontal axis, means for rotating the drum, said drum being adapted to contain in its bottom portion a batch of the material to be dehydrated whereby upon rotation of the drum a film of the material will be carried on its inner surfaces above the batch, a suction connection to said chamber, and baffle means associated with said one of the trunnions arranged to prevent the escape of splash therethrough; said baffle means comprising an open ended horizontally disposed body projecting inwardly of the drum from said one of the trunnions, said body having an annular internal enlargement intermediate its ends and radial openings communicating with said enlargement, and a baffle plate supported within said enlargement in peripherally spaced relation to the walls of the latter, said plate having an area greater than the inner open end of said body.

7. Dehydrating apparatus comprising a chamber adapted to contain in the lower portion thereof a batch of the material to be dehydrated, a drum rotatable in said chamber on a horizontal axis and disposed so that its lower portion is immersed in the material in the chamber whereby upon drum rotation a film of the material will be carried on the unimmersed external surfaces of the drum, a desiccant exposed in said drum in heat exchanging relation to the drum periphery, one end of the drum being open to the chamber, and a suction connection to the other end of the drum.

8. Dehydrating apparatus comprising a chamber adapted to contain in the lower portion thereof a batch of the material to be dehydrated, a drum rotatable in said chamber on a horizontal axis and disposed so that its lower portion is immersed in the material in the chamber whereby upon drum rotation a film of the material will be carried on the unimmersed external surfaces of the drum, a desiccant exposed in said drum in heat exchanging relation to the drum periphery, one end of said drum being provided with an axial opening, annular baffle means surrounding said opening and comprising two interleaved series of concentric members of which one is fixed and the other is carried by the drum, and a suction connection to the other end of said drum.

9. The method of dehydrating which comprises forming a film of the material to be dehydrated, subjecting the film to reduced pressure to promote evaporation, and passing the evolved vapors into a desiccant which is in heat exchanging relation with the evaporating zone, the desiccant having a sufficient heat supplying capacity so that the film is maintained at a temperature above freezing.

10. The method of dehydrating which comprises spreading on a wall a film of the material to be dehydrated, subjecting the film to reduced pressure to promote evaporation, and passing the evolved vapors into a desiccant which is in direct heat exchanging relation with said wall, the desiccant having a sufficient heat supplying capacity so that the film is maintained at a temperature above freezing.

11. The method of dehydrating which comprises maintaining on a wall a film continuously derived from a batch of the material to be dehydrated, subjecting the film to reduced pressure to promote evaporation, and passing the evolved vapors into a desiccant which is in direct heat exchanging relation with said wall, the desiccant having a sufficient heat supplying capacity so that the film is maintained at a temperature above freezing.

12. The method of dehydrating which comprises continuously withdrawing from and returning to a batch of the material to be dehydrated a film of the material, subjecting the film to reduced pressure to promote evaporation until the liquid content of the batch has been reduced as required, and passing the evolved vapors into a desiccant which is in heat exchanging relation with the evaporating zone, the desiccant having a sufficient heat supplying capacity so that the film is maintained at a temperature above freezing.

13. The method of dehydrating which comprises placing a batch of the material to be dehydrated in a walled container, maintaining on wall portions of the container a film of material drawn from the batch, subjecting the film to reduced pressure to promote evaporation until the liquid content of the batch has been reduced as required, and passing the evolved vapors into a desiccant which is in direct heat exchanging relation with said wall portions, the desiccant having a sufficient heat supplying capacity so that the film is maintained at a temperature above freezing.

WALTER A. PATRICK, JR.
JOHN D. ELDER.